(12) United States Patent
Bricheteau et al.

(10) Patent No.: US 10,117,081 B2
(45) Date of Patent: Oct. 30, 2018

(54) SHORT-RANGE COMMUNICATION DEVICE

(71) Applicant: ORANGE, Paris (FR)

(72) Inventors: Dimitri Bricheteau, Rennes (FR); Yoann Vincent, Cachan (FR)

(73) Assignee: Orange, Paris (FR)

( * ) Notice: Subject to any disclaimer, the term of this patent is extended or adjusted under 35 U.S.C. 154(b) by 145 days.

(21) Appl. No.: 15/321,443

(22) PCT Filed: Jun. 19, 2015

(86) PCT No.: PCT/FR2015/051635
§ 371 (c)(1),
(2) Date: Dec. 22, 2016

(87) PCT Pub. No.: WO2015/197956
PCT Pub. Date: Dec. 30, 2015

(65) Prior Publication Data
US 2018/0213381 A1    Jul. 26, 2018

(30) Foreign Application Priority Data
Jun. 23, 2014 (FR) ...................... 14 55798

(51) Int. Cl.
| H04B 7/00 | (2006.01) |
| H04W 4/80 | (2018.01) |
| H04M 1/725 | (2006.01) |
| H04B 5/00 | (2006.01) |

(52) U.S. Cl.
CPC ............ *H04W 4/80* (2018.02); *H04B 5/0031* (2013.01); *H04M 1/7253* (2013.01)

(58) Field of Classification Search
CPC ..... H04W 4/80; H04B 5/0031; H04M 1/7253
See application file for complete search history.

(56) References Cited

U.S. PATENT DOCUMENTS

| 2007/0121493 | A1* | 5/2007 | Bhardwaj | H04W 28/06 370/225 |
| 2009/0109639 | A1* | 4/2009 | Li | H04M 1/72527 361/748 |
| 2009/0111378 | A1 | 4/2009 | Sheynman et al. | |
| 2014/0099889 | A1* | 4/2014 | Seo | H04W 4/80 455/41.1 |
| 2014/0368411 | A1 | 12/2014 | Tsukamoto et al. | |

FOREIGN PATENT DOCUMENTS

| EP | 2 432 277 A1 | 3/2012 |
| WO | 2013/161705 A1 | 10/2013 |

* cited by examiner

*Primary Examiner* — Tuan Pham
(74) *Attorney, Agent, or Firm* — Drinker Biddle & Reath LLP

(57) ABSTRACT

A communication device configured to communicate with a terminal using a short-range wireless connection, the terminal comprising several functions, each ongoing function being able to be executed using a function identifier specific to the ongoing function. The communication device is configured for /a/ detecting an event related to an interaction device, the event being associated with a function identifier; /b/ transmitting a message comprising the function identifier and intended to execute a corresponding function of the detected terminal; /c/ and receiving, from the terminal, and via a local network, an access request linked to the detected event.

13 Claims, 4 Drawing Sheets

SHORT-RANGE COMMUNICATION DEVICE

CROSS-REFERENCE TO RELATED APPLICATIONS

This application is the U.S. national phase of the International Patent Application No. PCT/FR2015/051635 filed Jun. 19, 2015, which claims the benefit of French Application No. 14 55798 filed Jun. 23, 2014, the entire content of which is incorporated herein by reference.

BACKGROUND

The present invention concerns the domain of short-range communications between electronic equipment.

Within the family local network (e.g. the local network—Wi-Fi or cabled—created by the Internet gateway in a private home), the number of multimedia functionalities associated with the connected electronic equipment has increased significantly in the past few years: this equipment may be wireless audio speakers, USB keys, presence detectors, audio headphones, etc.

In order to be able to interact with this equipment (e.g. to be able to configure them or consult their content), the Internet gateways can propose minimalistic interfaces using an LED or LCD screen.

Nevertheless, these screens are often small in size and their consultation may be difficult based on the position of the gateway in the private home (e.g. in a television cabinet, in a drawer).

Thus, there is a need for, during an interaction with electronic equipment by a user, facilitating the experience of the latter.

SUMMARY

The present invention will improve the situation.

For this purpose, the present invention proposes in an advantageous manner a communication device allowing deporting some interaction members on a third-party terminal.

The present invention thus aims for a communication device configured to communicate with a terminal using a short-range wireless connection, the terminal comprising several functions, each ongoing function of said functions being able to be executed using a function identifier specific to said ongoing function.

The communication device comprises a plurality of interaction devices and is configured for:

/a/ detecting any event related to one interaction device of said interaction devices, said event being associated with a function identifier;

/b/ transmitting a message comprising the function identifier and intended to execute a corresponding function of said detected terminal;

/c/ receiving, from the terminal, and via a local network, an access request linked to said detected event.

"Short-range wireless connection" refers to a network or electromagnetic connection allowing transmitting information (e.g. bytes or simply a magnetic field) over a few centimeters or a few meters, but without exceeding 10 m (e.g. 30 m).

"Terminal function" refers to a method that may be performed in the terminal, this method being able to be part of an application, a calculation, etc.

Upon presenting the function identifier to the terminal, or to a terminal application, the function corresponding to the identifier can then be called and executed. The identifier can correspond to a series of numbers (possibly represented in hexadecimal form) or to a suite of alphanumerical characters (corresponding for example to the function name).

The transmission /b/ is not necessarily executed immediately after detection /a/. Other steps or message exchanges between the terminal and the communication device may occur.

The access request received is linked to the detected event. This link is a logical link. For examples, if the event is the connection of a storage medium to the communication device, the request may be a request of access to the content of the storage medium. The request may also be implicit: in this situation, simply mentioning the identifier of the function event in the request allows the communication device to know the detail of the desired request (e.g. if the identifier is an identifier associated with a Bluetooth speaker connection event, it is possible that a single request is possible with this event: configuring the speaker).

This request thus allows the terminal to know, upon detecting any interaction event, the data related to this event, in a manner as transparent as possible.

Furthermore, the communication device may be configured to reiterate the transmission /b/as long as a predetermined subset of at least one of the following conditions is not met:

(i) a period between the first transmission of said message and the reiteration has exceeded a predetermined time;

(ii) the communication device has received a request compliant to step /c/;

(iii) the number of reiterations has exceeded a predetermined number.

This reiteration can allow to ensure that the transmitted message is effectively captured by the terminal nearby (e.g. to reinforce the method against a collision of packages, a temporary electromagnetic disturbance, too large a distance between the terminal and the interaction device).

These conditions further allow preventing the terminal from receiving a message decorrelated from the interaction context.

The previously listed conditions cannot all be performed in the communication device. For example, only condition (i) or the set of conditions (i) and (iii) can be performed.

If the set of conditions includes more than one condition, it is possible to stop the reiteration as soon as a condition of this set is met or as soon as all the conditions of the set are met.

The transmission /b/ may advantageously be executed upon detection, by the communication device, of a terminal at a predetermined distance from said communication device.

Thus, the communication device can wait for the presence of a terminal nearby to notify it (i.e. by sending said message) of the occurrence of the event.

In a particular embodiment, the transmitted message of step /b/ may further be a message that can allow determining a distance from the communication device by the terminal.

Thus, the terminal can know its distance to the communication device and thus determine if the received message should be processed (i.e. if the received message is intended for it).

In addition or alternatively, the interaction device may be an interaction device among a USB port, a pushbutton, a Bluetooth connection, and an NFC connection.

The event related to an interaction device may also be an event among plugging a USB equipment on the communication device, associating a Bluetooth equipment with the communication device, and pressing a button of said communication device.

In a particular embodiment, the short-range wireless connection may be an NFC connection or a "Bluetooth Low Energy" connection (or BLE).

Advantageously, transmitting said message may be done via the short-range wireless connection.

Furthermore, transmitting said message may be done upon request from said terminal, via the aforesaid local network.

Indeed, it is possible to predict that, once the terminal is detected (for example via the short-range wireless connection), the terminal contacts the communication device via a local network (a domestic Wi-Fi network, for example) distinct from the network generated by the short-range connection.

The communication device may further be configured for:
before transmitting said message:
transmitting via the short-range wireless connection and to said terminal an activation message, the message being intended to activate an application of said terminal, and
receiving from said terminal and via said local network a transmission request from said function identifier.

Furthermore, the access request may be a request among:
a request triggering, upon receipt by the communication device, access to data linked to the interaction device;
a request triggering, upon receipt by the communication device, configuration of a communication network for the detected terminal;
a request triggering, upon receipt by the communication device, configuration of peering of the detected terminal with an appliance linked to said interaction device.

Furthermore, a method for communicating allowing the resolution of the technical problems mentioned previously is advantageous.

Therefore, the present invention also aims for a method for the communication between a communication device and a terminal using a short-range wireless connection, the terminal comprising several functions, each ongoing function of said functions being able to be executed using a function identifier specific to said ongoing function, the communication device comprising a plurality of interaction devices.

The method comprises:
/a/ detecting any event related to one interaction device of said interaction devices, said event being associated with a function identifier;
/b/ transmitting a message comprising the function identifier and intended to execute a corresponding function of said detected terminal;
/c/ receiving, from the terminal, and via a local network, an access request linked to said detected event.

A computer program, performing all or part of the method described above, installed on a preexisting equipment is advantageous itself.

Thus, the present invention also aims for a computer program including instructions for performing the method described previously, when this program is executed by a processor.

This program can use any programming language (for example, an object-oriented language or other), and be in the form of an interpretable source code, a partially compiled code, or a totally compiled code.

FIGS. 2a and 2b described in detail below, may form the flow chart of the general algorithm of such computer program.

BRIEF DESCRIPTION OF THE DRAWINGS

Other characteristics and advantages of the invention will appear again in the following description. The latter is purely illustrative and must be read in conjunction with the attached drawings on which.

DETAILED DESCRIPTION

Figure 1:
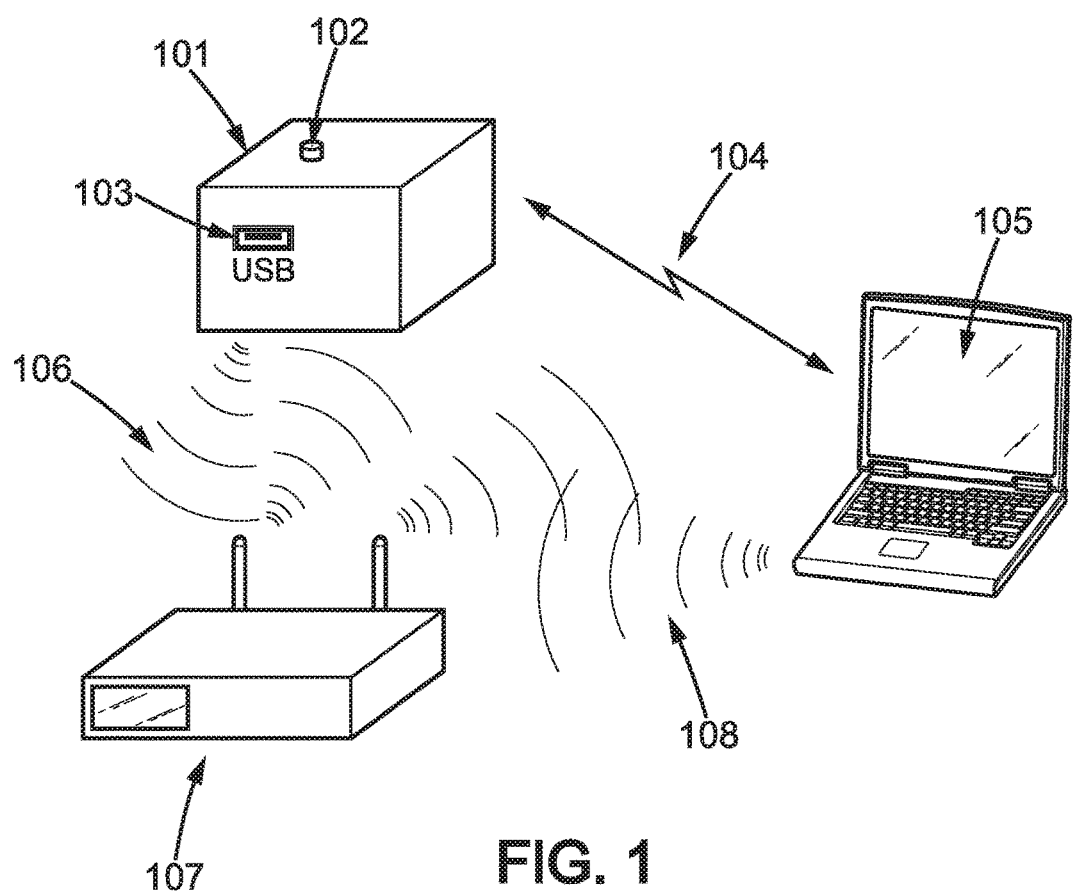
FIG. 1 illustrates a local network comprising a communication device according to an embodiment of the invention.

FIG. 1 illustrates a local network comprising a communication device according to an embodiment of the invention.

In this embodiment, the communication device 101 includes several interaction devices:

A button 102 with which the user can interact by pressing on it according to a predetermined method (e.g. a short press, a long press, etc.), A USB port 103 with which the user can interact by inserting a USB key or any other USB equipment inside.

Of course, the communication device may include other interaction devices such as a "FireBolt", "HDMI", "Ethernet", or "Jack" port or any other type of ports.

During an interaction (such as defined previously) with at least one interaction device, the communication device 101 can search for terminals 105 nearby. This search may take several forms:

transmitting a broadcast package on the local network to the connected terminal;

activating an NFC (or "near field communication") transmitter/receiver;

transmitting a broadcast package on a wireless network (for example on a Bluetooth network or a "Bluetooth Low Energy" network of BLE). The package may then be an iBeacon™ package.

The fact that the device 101 searches for terminals 105 nearby means that this device 101 puts itself in a configuration likely to detect a terminal 105 nearby (e.g. activation of a near field communication receptor) or likely to allow a terminal 105 nearby to detect the presence of the device 101 (e.g. transmitting of a broadcast message on a network).

The network 104 used for this detection may advantageously be distinct from the Wi-Fi network (local network) created by the Internet gateway.

Upon detecting proximity between the terminal 105 and the device 101 (e.g. detecting a distance below a predetermined threshold), the terminal 105 is able to contact the device 101 via the local network created by the Internet gateway 107 of the private home (e.g. Wi-Fi or cabled).

Thus, it is useful that the device 101 is connected to this local network (link 106) and that the terminal 105 is connected to this local network (link 108).

The contact address (e.g. the IP address of the device 101) may be preconfigured in the terminal 105. This contact address may also be determined by a network discovery mechanism such as "Bonjour", "Avahi", "Pastry", "Zero-Conf", "UPnP", "SNMP", etc.

The terminal 105 is then able to perform a request on the device 101 in order to obtain information related to the interaction of the previously mentioned user.

Figure 2A:
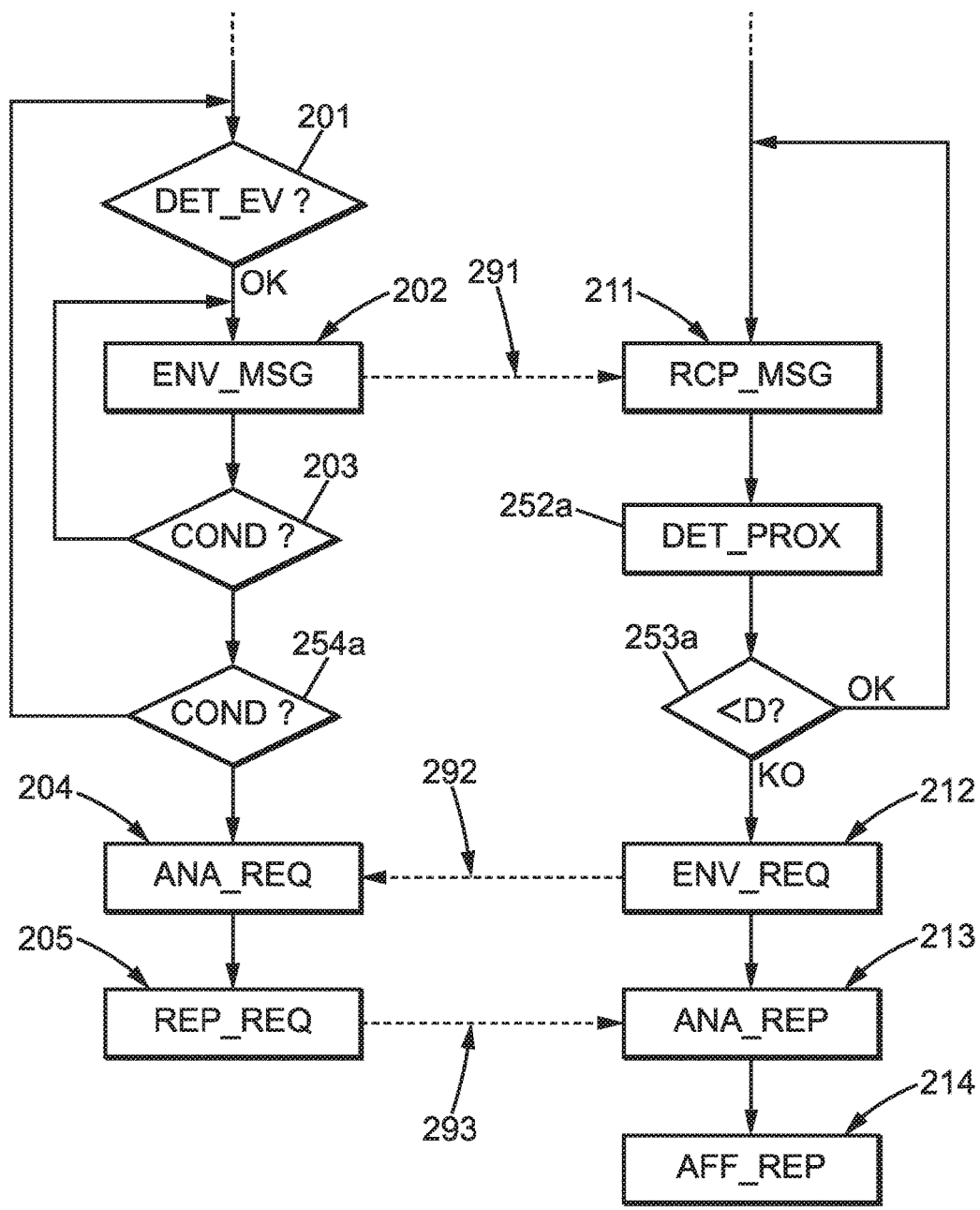
FIG. 2a shows two flow charts performed by a communication device according to an embodiment of the invention and by a terminal respectively.

FIG. 2a shows two flow charts of detailed performance, by a communication device 101 according to an embodiment of the invention and by a terminal, respectively.

In this embodiment, the device 101 has a waiting state 201 for interaction events as described previously. These events may be subsets of the group comprising inserting a USB key, Bluetooth audio headphone, etc.

An identifier (named "function identifier") is associated with this event.

If an event is detected (test 202, output OK), a message is sent via a BLE network (arrow 291) using, for example, an iBeacon™ package (step 202). This message may include (see FIG. 3) a particular field containing the identifier associated with the event. If this message does not include this identifier (e.g. technical restriction or implementation choice), this identifier can then be stored in a memory battery provided for this purpose in the communication device 101, for example a FILO battery (for "First In Last Out").

A terminal 105 nearby can then receive this message sent during step 202 if it is within radio range (in cases of a wireless network) (step 211).

Once received, the terminal can, in an optional manner, determine the estimated distance from the terminal 105 to the communication device 101. There are numerous methods available allowing such determination, such as, for example, the one used in the iBeacon™ protocol (see FIG. 3).

If this estimated distance is larger than a distance preconfigured in the terminal (test 253a, output OK), the terminal is set back in network listening configuration (named "short-range network") for receiving a new message.

In the opposite case (test 253a, output KO), the terminal sends a request (arrow 292) to the device 101 either via the "short-range" network or, preferably, via the local network created by the local Internet gateway (e.g. Wi-Fi network).

This request (arrow 292) possibly contains the identifier transmitted with the previous message (arrow 291) if the latter contains a function identifier.

Upon receipt of the request by the device 101 (step 204), the request is analysed.

Moreover, the message sending (step 202) by the device 101 may be reiterated, for example, in a regular manner (e.g. every second), as long as the communication device has not received the request previously mentioned (arrow 292 from the terminal). Alternatively or additionally, sending the message is reiterated during a predetermined time (e.g. during 10 seconds after detecting the interaction). Alternatively or additionally, sending the message is reiterated a predetermined number of times.

The occurrence of one or several of these conditions may stop the reiteration.

Assuming the request (arrow 292) contains a function identifier, this identifier is extracted from the request. Assuming no identifier is present in the request (e.g. implementation choice), the communication device determines which first identifier to use in the memory battery of the function identifiers provided for this purpose, the battery being for example a FIFO ("First In First Out") battery or a FILO ("First In Last Out") battery.

Based on this determined or extracted identifier, the communication device can determine the answer to this request (step 205), answer which is linked to the identifier and hence to the detected event.

For illustration purposes, this answer sent to the terminal (arrow 293) may be, specifically:

an HTML page allowing configuring a Bluetooth equipment recently connected to the device 101, an XML data file detailing the content of a USB key that has be inserted in a USB port of the device 101, a page allowing choosing the redirection of the multimedia flow such as sound or video during the connection of a USB speaker to the device 101 or of a cabled speaker connected to the device 101 via a "Jack" plug.

Once received this response is analysed (step 213) by the terminal and displayed (step 214) on the screen of the latter.

Figure 2B:
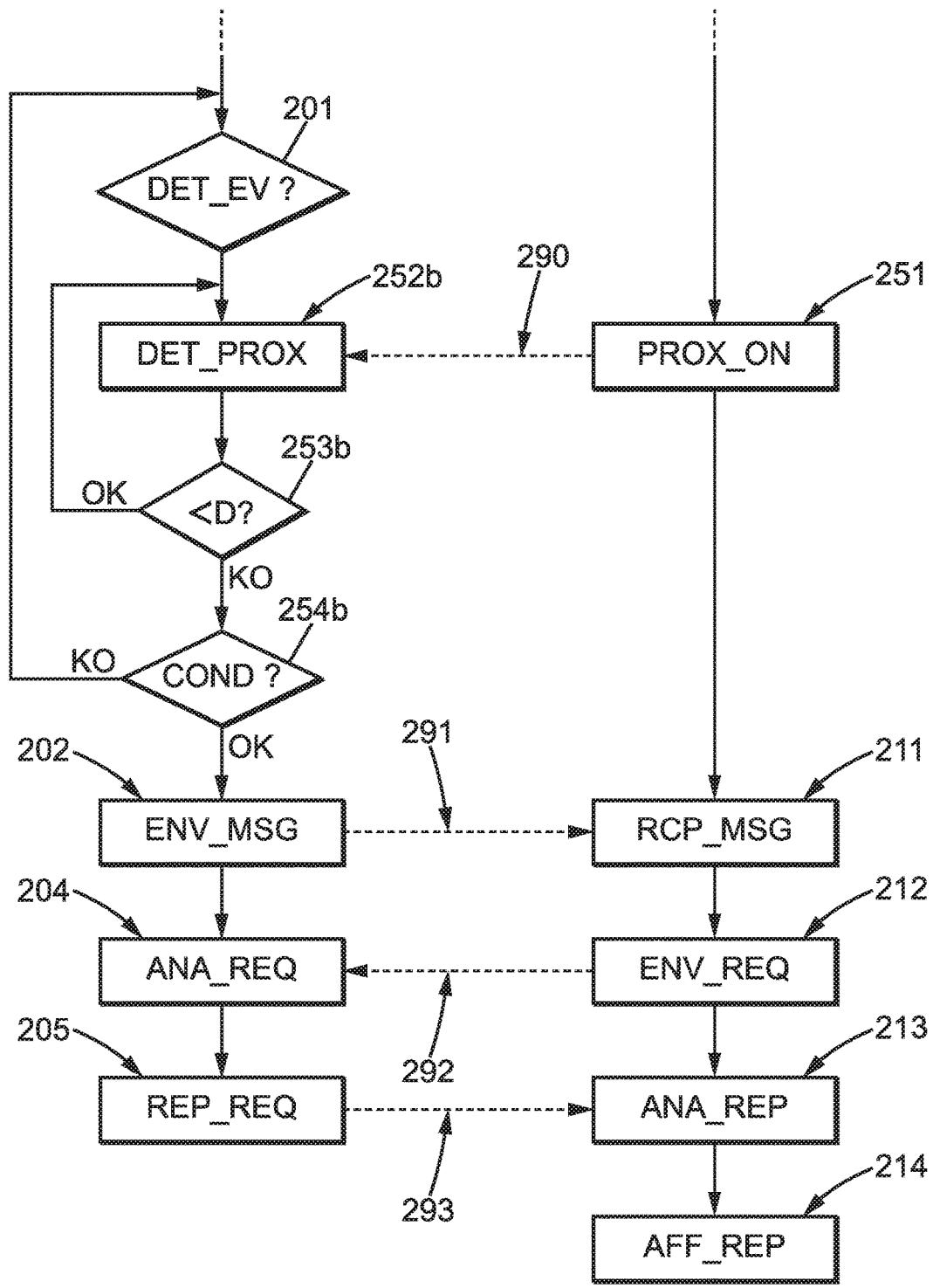
FIG. 2b shows two alternative flow charts performed by a communication device according to another embodiment of the invention and by a terminal respectively.

FIG. 2b shows two alternative flow charts of detailed performance performed by a communication device according to another embodiment of the invention and by a terminal, respectively.

These two flow charts are close to those described in FIG. 2a. Thus, the referenced blocks under the same numerical reference correspond, unless otherwise indicated, substantially to the same steps.

In this embodiment, the active step of detecting proximity to the terminal 105 and the device 101 is not performed by the terminal, but by the device 101.

If an event is detected (test 201, output OK), the device 101 activates its proximity detection device (e.g. NFC receiver). If a terminal 105 is brought close to the device 101 with an activated proximity transmitter (step 251, e.g. NFC transmitter), the transmission from this transmitter (arrow 290) will be captured by the proximity detection device (step 252b).

Once this transmission is captured, the device 101 can, in an optional manner, determine the estimated distance from the terminal 105 to the communication device 101.

It this estimated distance is larger than a distance preconfigured in the device 101 (test 253b, output OK), the proximity detection device remains activated for detecting a new transmission from the device.

Furthermore, and even if the estimated distance is shorter than the distance preconfigured in the device 101 (test 253b, output KO), the device 101 can implement additional conditions (test 254b). For example, if the delay between detecting of the interaction and detecting the proximity exceeds a predetermined time, it is possible to not execute the rest of the method described and to configure the device 101 so that it waits for a new detection of interaction (test 254b, output KO).

If all the conditions are met to allow executing the rest of the method (test 254b, output KO), the device 101 can transmit a message (arrow 291) to the terminal (via the short-range network used for presence detection or via a local network to which the device 101 and the terminal 105 are connected) (step 202).

This message may contain the function identifier associated with the detected event. If this message does not comprise the function identifier, it is useful to store it in the memory battery for a future reuse.

Upon receiving this message (step 211), the terminal 105 transmits a request (step 212) to the device 101.

This request (arrow 292) possibly contains the identifier transmitted with the previous message (arrow 291) if the latter contains a function identifier.

Upon receipt of the request by the device 101 (step 204), the request is then analysed.

Steps 212, 213, 205 and 214 remain unchanged with regards to FIG. 2a.

Figure 3:
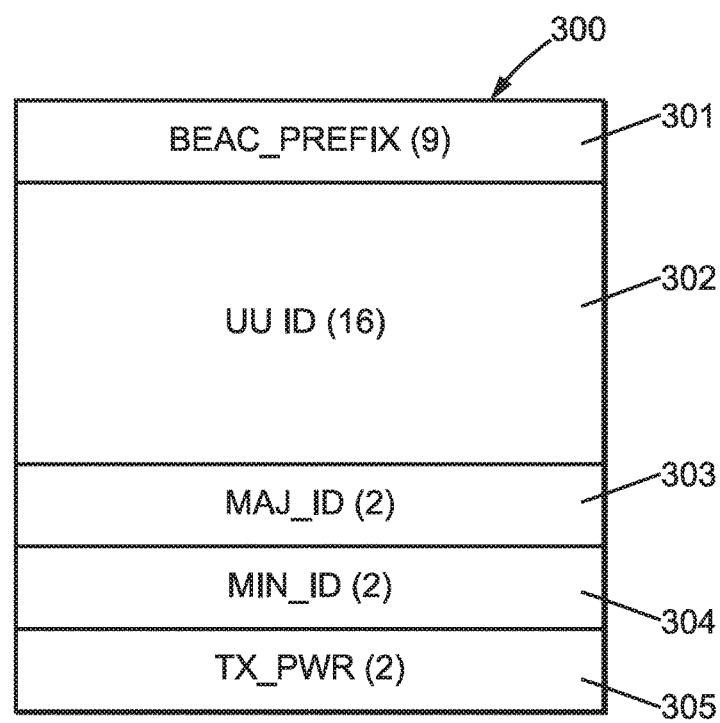
FIG. 3 illustrates an example of package, for example of iBeacon™ type, contained in a message transmitted by the communication device according to an embodiment of the invention.

FIG. 3 illustrates an example of this package transmitted by radio waves, for example of iBeacon™ type, contained in a message transmitted by the communication device according to an embodiment of the invention (see FIG. 2a, for example).

The "data" part of this message 300 may thus comprise five fields:

a "prefix" field with 9 bytes indicating that this package (or message) is a proximity detection package (field 301) or an iBeacon™ passage (for example 02 01 1A 1A FF 4C 00 02 15);

an application identifier field with 16 bytes (field 302);

a "major" field with 2 bytes (field 303);

a "minor" field with 2 bytes (field 304);

a power indication field with 2 bytes allowing to indicate the estimated power of the output signal after 1 meter of propagation. This field allows the terminal receiving the signal to estimate the true distance based on the true strength of message receipt (field 305).

During the receipt of a message of this type by the terminal (i.e. containing in the example above a "prefix" field (301) equivalent to 02 01 1A 1A FF 4C 00 02 15), the application associated with the application identifier field (302) can be activated.

This activated application is then able to extract the values of the "major" (303) and "minor" (304) fields, respectively.

Therefore, it is possible to predict that the step of sending the message (step 202) of FIG. 2a includes in this message the function identifier corresponding to the detected event in the "major" (or "minor") field. Therefore, upon receiving this message, the terminal can extract this identifier in the corresponding field.

Figure 4:
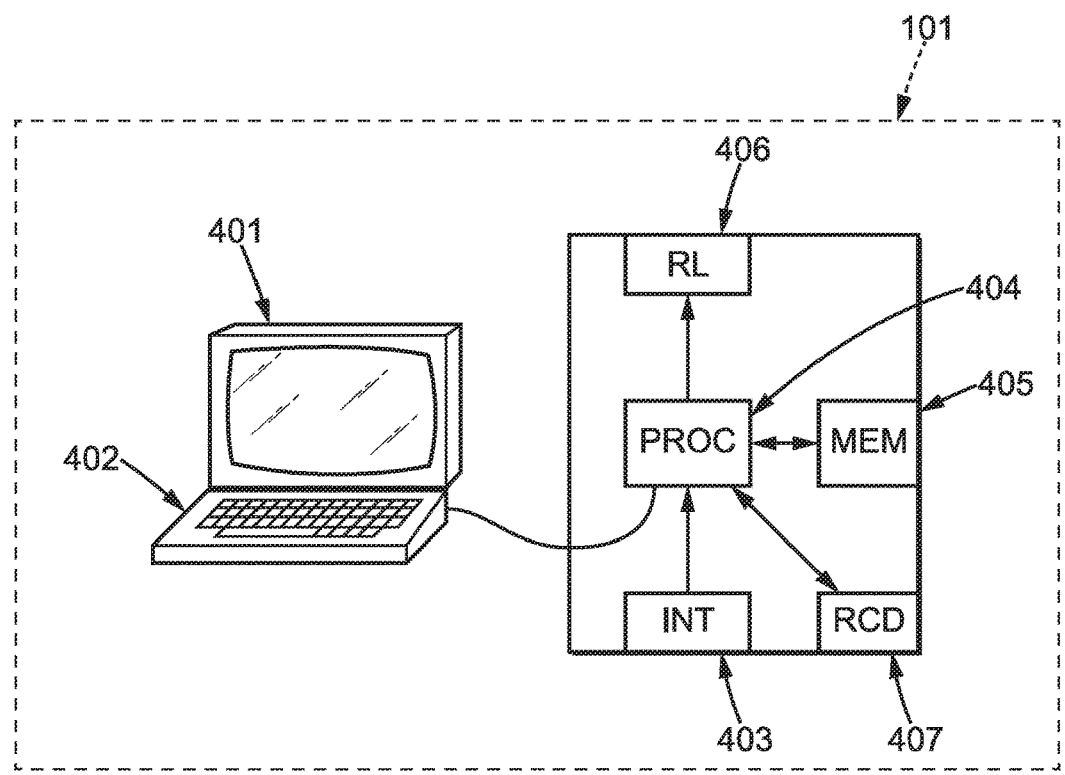
FIG. 4 illustrates a communication device in an embodiment of the invention.

FIG. 4 illustrates a communication device in an embodiment of the invention.

FIG. 4 represents an example of communication device 101 in an embodiment of the invention.

In this embodiment, the device 101 includes an electronic equipment, comprising a memory 405 for storing the instructions allowing the performance of the method, if need be, an identifiers battery and temporary data for performing the different steps of the method as described previously.

The computer further includes a circuit 404. This circuit may be, for example:

a processor capable of interpreting the instructions in the form of a computer program, or an electronic card wherein the steps of the method of the invention are described in the silicon, or even a programmable electronic chip such as an FPGA chip (for "Field-Programmable Gate Array").

This device 101 includes one or several interaction devices 403 for allowing the interaction as previously described, an interface of a short-range network such as a Bluetooth or NFC interface, and an interface to a local network 406 such as a Wi-Fi network interface. Finally, the device 101 may include, in an optional manner, for allowing an easy interaction with a user, a screen 401 and a keyboard 402. Of course, the keyboard is optional, in particular in the context of a device 101 having a touchscreen, for example.

Furthermore, the functional scheme shown in FIG. 2a or 2b is a typical example of a program in which some instructions may be performed on the device 101 described. For this purpose, FIG. 2a or 2b may correspond to a flow chart of the general algorithm of a computer program in the meaning of the invention.

Of course, the present invention does not limit itself to the embodiments described above as examples; it extends to other alternatives.

Other embodiments are possible.

For example, presence detection may be performed using a near field transmission (or "NFC") by adding in the NFC messages (e.g. in a personalised field) the function identifier mentioned above.

The invention claimed is:

1. A communication device configured to communicate with a terminal through a short-range wireless connection, the terminal comprising several functions, each ongoing function of the several functions being able to be executed using a function identifier specific to the ongoing function, wherein the communication device comprises a plurality of interaction devices, wherein the communication device is configured for:

/a/ detecting an event related to an interaction device of the plurality of interaction devices, the event being associated to a function identifier;

/b/ transmitting a message comprising the function identifier and intended to execute a corresponding function of the terminal;

/c/ receiving, from the terminal, and via local network, an access request linked to the detected event.

2. The device according to claim 1, further configured to reiterate the message transmission /b/ as long as a predetermined subset of at least one of the following conditions is not met:

a period between the first transmission of the message and the reiteration has exceeded a predetermined time;

the communication device has received a compliant request upon receipt /c/;

the number of reiterations has exceeded a predetermined number.

3. The device according to claim 1, wherein the transmission /b/ is executed upon detection, by the communication device, of the terminal at a predetermined distance from the communication device.

4. The device according to claim 1, wherein the transmitted message can allow determining a distance to the communication device by the terminal.

5. The device according to claim 1, wherein the interaction device is an interaction device among a USB port, a pushbutton, a Bluetooth connection, and an NFC connection.

6. The device according to claim 1, wherein the event related to an interaction device is an event among plugging a USB device into a communication device, associating a Bluetooth device with the communication device, and pressing a button of the communication device.

7. The device according to claim 1, wherein the short-range wireless connection is an NFC connection or a Bluetooth Low Energy connection.

8. The device according to claim 1, wherein transmitting the message is done via a short-range wireless connection.

9. The device according to claim 1, wherein transmitting the message is done upon request from the terminal, via the local network.

10. The device according to claim 1, wherein the communication device is further configured for:

before transmitting the message:
   transmitting via the short-range wireless connection and to the terminal an activation message, the activation message being intended to activate an application of the terminal, and
   receiving from the terminal and via the local network a transmission request for staid the function identifier.

11. The device according to claim 1, wherein the access request is one request among:
   a request triggering, upon receipt by the communication device, access to data linked to the interaction device;
   a request triggering, upon receipt by the communication device, configuration of the communication network for the terminal;
   a request triggering, upon receipt by the communication device, configuration of a peering of the detected terminal with a device linked to the interaction device.

12. A method for the communication between a communication device and a terminal using a short-range wireless connection, the terminal comprising several functions, each ongoing function of the several functions being able to be executed using a function identifier specific to the ongoing function,
   the communication device comprising a plurality of interaction devices,
   wherein the method comprises:
   /a/ detecting any event related to one interaction device of the interaction devices, the event being associated with a function identifier;
   /b/ transmitting a message comprising the function identifier and intended to execute a corresponding function of the detected terminal;
   /c/ receiving, from the terminal, and via local network, an access request linked to the detected event.

13. A non-transitory computer readable storage medium, having stored thereon a computer program comprising program instructions,
   the computer program being loadable into a data-processing unit and adapted to cause the data-processing unit to carry out, when the computer program is run by the data-processing device:
   /a/ detecting an event related to an interaction device of a plurality of interaction devices of a communication device, the event being associated to a function identifier;
   /b/ transmitting a message comprising the function identifier and intended to execute a corresponding function;
   /c/ receiving via local network an access request linked to the detected event.

* * * * *